United States Patent [19]

Erwin

[11] 4,084,445

[45] Apr. 18, 1978

[54] CONTRA-ROTATING VIBRATOR

[76] Inventor: Arthur F. Erwin, 305 Woodland La., Oconomowoc, Wis. 53066

[21] Appl. No.: 639,773

[22] Filed: Dec. 11, 1975

[51] Int. Cl.$^2$ .............. F16H 33/00

[52] U.S. Cl. .............. 74/61; 310/115; 310/81

[58] Field of Search .............. 310/115, 81; 44/61

[56] References Cited

U.S. PATENT DOCUMENTS

| | | | |
|---|---|---|---|
| 1,629,206 | 5/1927 | Dollmann | 310/115 |
| 1,749,883 | 3/1930 | Ledwinka | 310/115 |
| 1,889,208 | 11/1932 | Masterson et al. | 310/115 |
| 2,153,523 | 4/1939 | Roberts et al. | 310/115 |
| 3,398,798 | 8/1968 | Shelton | 74/61 |

*Primary Examiner*—Benjamin W. Wyche
*Assistant Examiner*—Wesley S. Ratliff, Jr.
*Attorney, Agent, or Firm*—Colton & Stone, Inc.

[57] ABSTRACT

A device for producing linear vibratory motion includes, in the preferred embodiment, an electric motor of the contra-rotating type, i.e. one in which both the rotor and stator rotate about a common axis and in opposite directions. One or more pairs of eccentric weights are provided, one weight of each pair rotating with the rotor and the other with the stator. Gearing is provided to assure synchronized rotation of the rotor and stator and to determine the angle of the plane in which the weights are aligned and, hence, the plane along which the vibratory motion is directed.

18 Claims, 10 Drawing Figures

FIG. 5
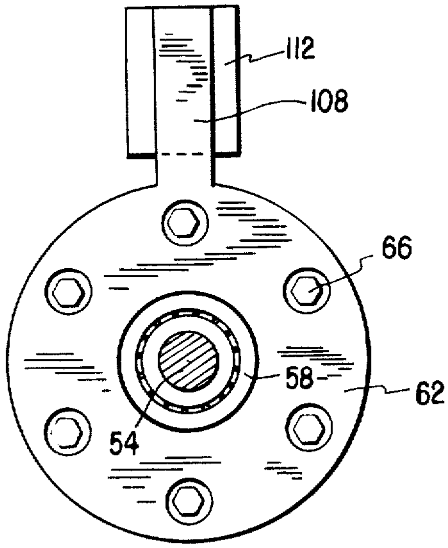
FIG. 6
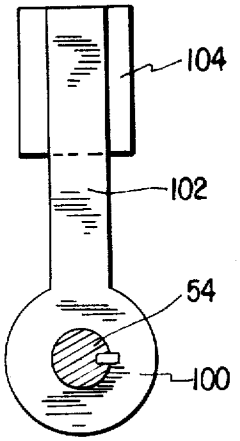
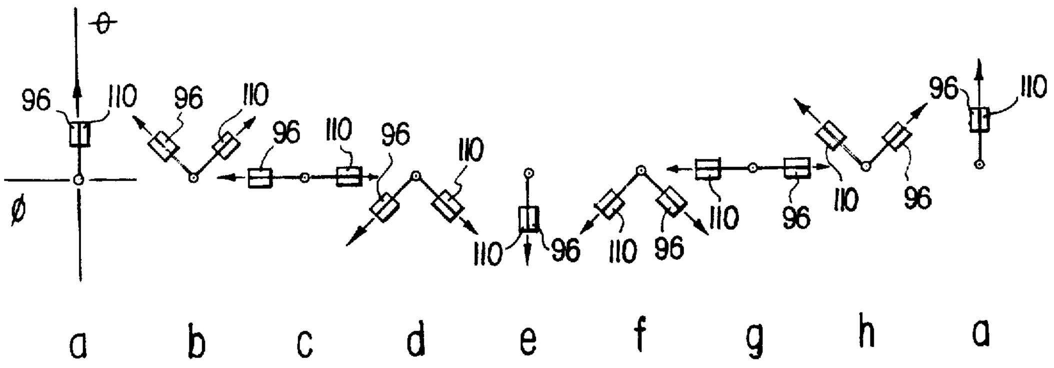
FIG. 7

CONTRA-ROTATING VIBRATOR

BACKGROUND OF THE INVENTION

The present invention pertains to devices for producing vibratory motion and, more particularly, to devices for producing linear vibratory motion.

Vibrating devices are widely used in industry for actuating oscillating conveyors, shaking screens, feeders, inspection tables, container fillers, bin and hopper agitators, packing devices to increase the compaction and density of materials and to aid the compacting effect of rollers in earthmoving and earthfill operations. The use of vibrating devices has increased extensively in the food handling and processing fields, for products such as corn, beans, peas, etc., where oscillating devices provide advantages such as gentle handling, control-liability, reliability and improved sanitation.

Several types of vibrating devices are now employed, including electro-magnetic, pneumatic, rotating eccentric weights and cam operated eccentric drive arms. The electro-magnetic and pneumatic linear motion vibrators are inherently high frequency and short stroke units and are thus limited to use with relatively low loads. Units with rotating eccentric weights provide only orbital reaction to the driven unit and not linear motion. In those units having eccentric drive arms, the arms are connected to stationary mountings thus transmitting much of the reaction force to the floor or building structure and requiring counterbalancing or isolation devices.

A widely used type of vibratory motion generating device which avoids the difficulties of the vibrators discussed above is the contra-rotating type which employs a pair of eccentric weights geared to rotate in opposite directions about a common axis. Loveless U.S. Pat. No. 3,173,300 illustrates a device of this type. Contra-rotating vibrators of the prior art, such as the Loveless device, require separate drive means thus complicating the mounting of the device as well as increasing the cost thereof. An additional disadvantage of the prior art devices is the lack of any means for readily varying the direction of the vibratory motion.

Among the primary objects of the present invention is the provision of a vibratory motion generating device of the contra-rotating type which incorporates the drive means and contra-rotating weights into a unified, compact structure. It is also an object of the invention to provide a self-contained contra-rotating vibrator which includes a sealed housing enabling the device to withstand the cleaning and sanitizing procedures employed in food handling installations.

A further object of the invention is the provision of a contra-rotating vibrator producing linear vibrations and which may be readily adjusted to vary both the direction of the vibratory motion and the frequency thereof.

BRIEF DESCRIPTION OF THE INVENTION

The above and other objects of the invention which will become apparent in the detailed description thereof are achieved by the provision of a vibratory motion generator which includes a contra-rotating motor having a rotor and a stator both journelled for rotation about a common axis and rotating in opposite directions; at least one pair of eccentric weights, one of which rotates with the rotor and the other of which rotates with the stator; gearing interconnecting the rotor and stator to assure synchronized rotation thereof; and means for controllably varying the orientation of the weights relative to one another to vary the plane in which they pass and, accordingly the plane along which the vibratory motion is directed.

For a more complete understanding of the invention and the objects and advantages thereof, reference should be had to the following specification and the accompanying drawings wherein preferred embodiments of the present invention are shown.

BRIEF DESCRIPTION OF THE DRAWINGS

In the drawings

FIGS. 4–6 are transverse sectional views, taken along the lines 4—4 through 6—6, respectively, of FIG. 3;

FIG. 7 is a diagrammatic showing of the positions of the eccentric weights through one cycle of operation;

DETAILED DESCRIPTION OF THE PREFERRED EMBODIMENTS

Figure 1:
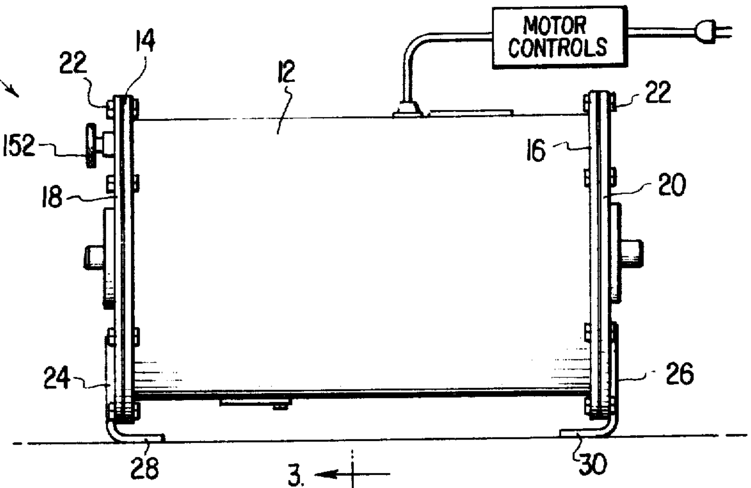
FIG. 1 is a side elevational view of the preferred embodiment of the contra-rotating vibrator of the present invention.
Figure 2:
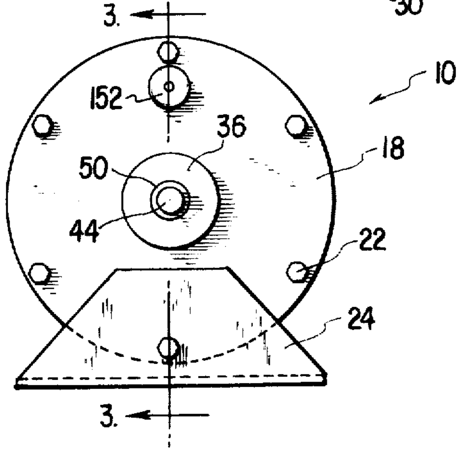
FIG. 2 is an end elevational view of the vibrator of FIG. 1.
Figure 4:
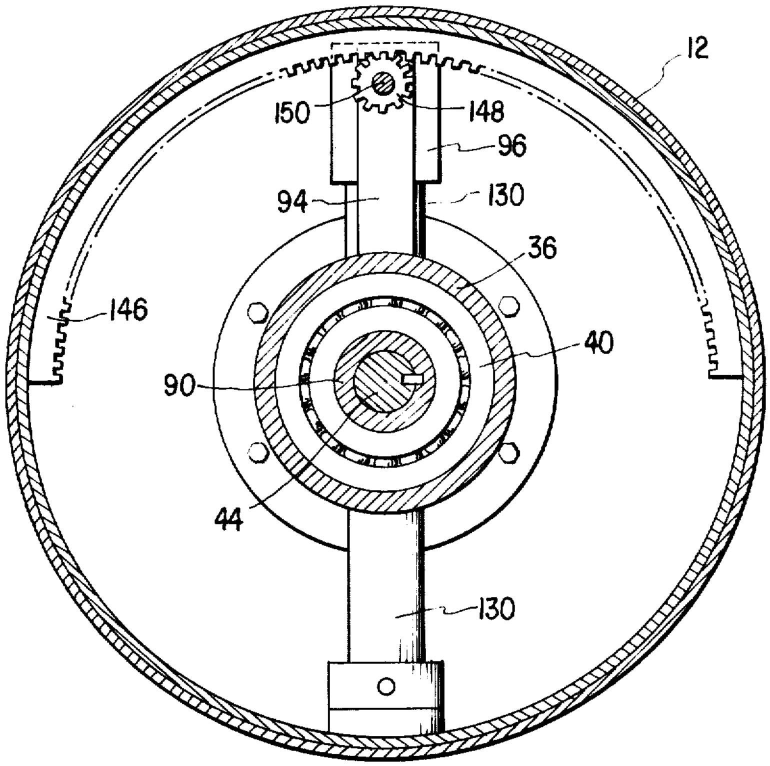
Figure 3:
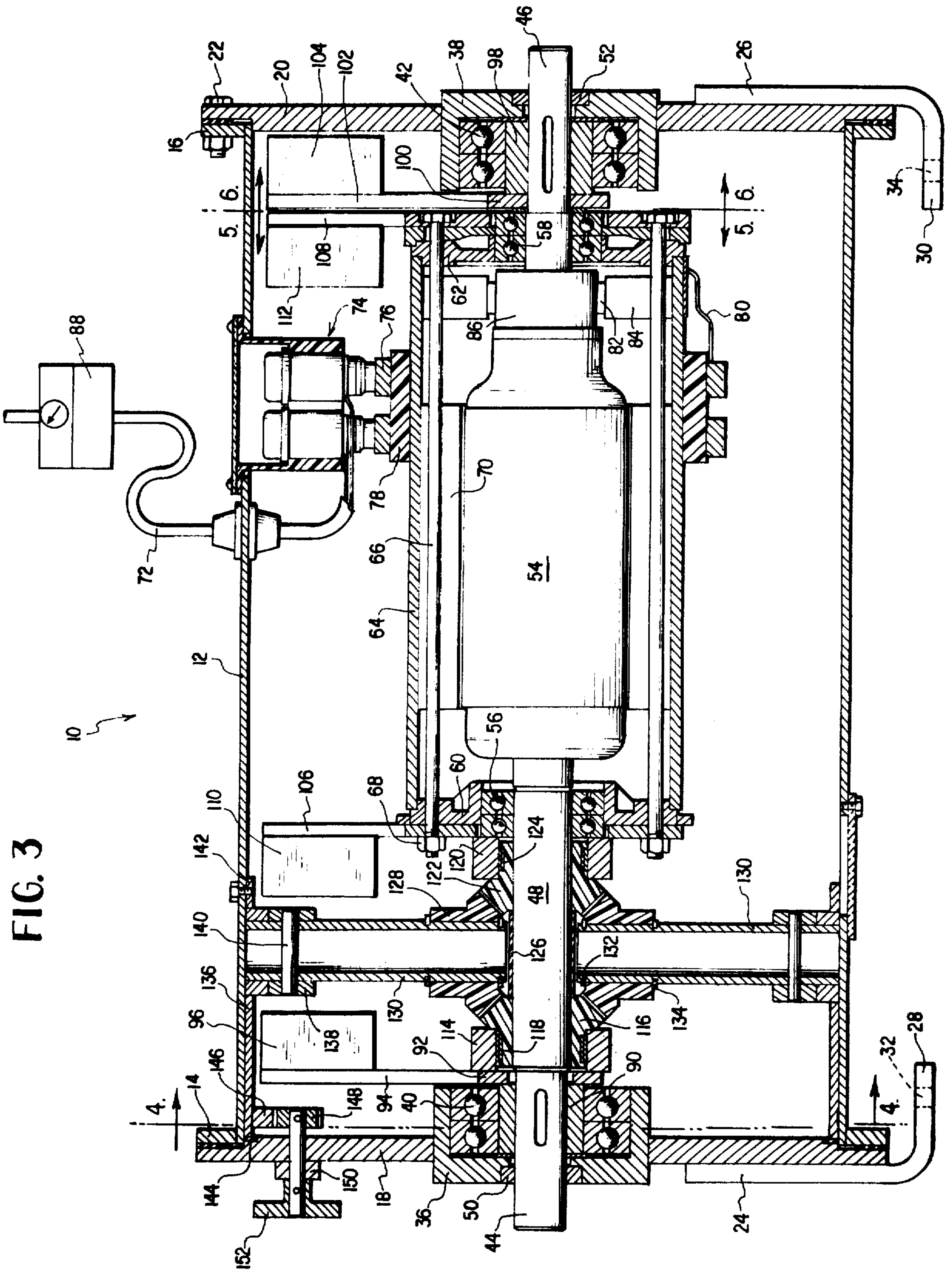
FIG. 3 is a longitudinal sectional view, taken along the line 3—3 of FIG. 2.

Referring now to FIGS. 1-6, the first preferred embodiment of the contra-rotating vibrator apparatus of my invention will now be described in detail. The vibrator apparatus, designated generally by the reference numeral 10, has a cylindrical housing 12 with end flanges 14 and 16 to which end plates 18 and 20 are secured, for example, by means of the bolts 22. Mounting plates 24, 26 are carried by the end plates 18, 20 and these mounting plates have their lower ends bent at right angles to provide feet 28, 30 with mounting holes 32, 34 for securing the vibrator apparatus 10 to the equipment with which it is associated.

Centrally located on each end plate 18, 20 is a hub 36, 38 having a through bore coaxially aligned with the cylindrical housing 12. Bearing assemblies 40, 42 within the hubs 36, 38 journal the opposite ends 44, 46 of a shaft 48, shaft seals 50, 52 being provided between the hubs 36, 38 and the shaft ends 44, 46. Mounted on the shaft 48 is the rotor assembly 54 of an electric motor and, adjacent the ends of the rotor assembly 54, bearing assemblies 56, 58. The bearing assemblies 56, 58 journal motor end plates 60, 62. A tubular sleeve 64 extends between the end plates 60, 62, the sleeve and end plates being interconnected by means of tie bolts 66 and nuts 68. The sleeve 64 carries, on its inner wall, the stator assembly 70 of the motor, the stator assembly being in operative alignment with the rotor assembly 54. Electrical connections for the motor are provided by a line cord 72 extending through the housing 12 and connected to a brush holder assembly 74 mounted on the inner surface of the housing. A pair of slip rings 76 carried on a band 78 of insulating material on the outer surface of the motor housing 64 engage the brushes of the brush holder assembly 74, receiving current therefrom. Conductors 80 electrically interconnect the slip rings 76 and the coils of the stator assembly 70 as well as brushes 82 carried in brush holders 84 mounted on either the inner wall of the sleeve 64 or the motor end plate 62. Depending on the type of motor, the brushes 82 contact either a commutator 86 or slip rings for transmitting current to the windings of the rotor assembly 54. It should be noted that the motor just described is a contra-rotating motor, i.e., a motor in which both the rotor and stator assemblies rotate, the two assemblies rotating in opposite directions.

The bearing assembly 40 which journals the left end 44 of the rotor shaft 48 includes a sleeve 90 which is keyed to and rotates with the shaft 48. Rigidly attached to the inner end of the sleeve 90 is a disk 92. A radially extending arm 94 is formed integrally with the disk 92 and mounts a weight 96 adjacent the radially outer end thereof. The bearing assembly 42 at the opposite end of the rotor shaft 48 includes a similar sleeve 98 having a disk 100 rigidly connected thereto and provided with a radially extending arm 102 which also carries a weight 104. The two weights 96, 104 carried by the rotor shaft 48 are aligned with one another, having their centers of gravity in a common radial plane relative to the axis of rotation of the shaft 48. The end plates 60, 62 of the motor housing also having radially extending arms 106, 108 on which are mounted weights 110, 112, the weights being aligned with one another so that their centers of gravity lie in a common radial plane.

It will be apparent that the motor is of the contra-rotating type, i.e. one in which both the rotor and stator assemblies are rotatably mounted, and in which the rotor and stator assemblies rotate in opposite directions. Since the weights 96 and 104 rotate with the rotor shaft 48 and the weights 110 and 112 rotate with the stator housing 64, these two pairs of weights are also contra-rotating.

The manner in which the device of my invention produces linear vibratory motion will be apparent from a consideration of the movement of a set of the contra-rotating weights through a complete revolution. This movement is illustrated schematically in FIG. 7 where the motion of the weights 96 and 110 is diagrammed. The position of the weights 96 and 110 at position a corresponds to the position of these weights in FIG. 3 with the weight 96 rotating in the counterclockwise direction while the weight 110 rotates in the clockwise direction and aligned in a radial plane $\theta$. In this position, the centrifugal forces of the two weights, indicated by the arrows extending therefrom, are aligned with one another, thereby adding to a maximum. As the two weights rotate from position a through position b to position c at which they are directly opposite one another in a second radial plane $\phi$ orthogonal to the plane $\theta$, the component of the centrifugal force of each weight parallel to the plane $\theta$ decreases to zero. The $\theta$ component then increases, reaching a maximum at the position e directed oppositely to the force at position a. It will be noted that the force components along the plane $\phi$ are always opposed to one another and, hence, cancel one another so that the system produces forces only in the plane $\theta$, these forces passing alternatively between maximums in opposite directions. It should be noted that, while in FIG. 3, the plane $\theta$ is a vertical plane and the vibratory motion is thus in a vertical direction, the direction of vibratory motion may be varied by varying the direction of the plane $\theta$, the plane in which the weights 96 and 110 are aligned. As will be described below, the present invention includes means for varying the orientation of the plane $\theta$ and hence, the direction of the vibratory motion as well as insuring the rotation of the weights at equal angular velocities.

Referring again to FIGS. 3 and 4, the means by which the sets of contra-rotating weights are maintained in synchronization and by which the direction of the linear vibratory motion may be varied will now be described. A collar 114 is connected to and rotates with the disk 92 carrying the weight 96. The collar 114 has a central bore concentric about the rotor shaft 48 and the hub of a bevel or miter gear 116 is received in this bore, a driving connection between the collar 114 and the gear 116 being provided by a friction ring 118. A similar collar 120 is connected to and rotates with the stator housing end plate 60 and, hence, with the weight 110. A second miter gear 122 has its hub received within the bore of the collar 120 and is drivably connected thereto by a friction ring 124. The two gears 116, 122 are received on the rotor shaft 48 and separated by a spacer sleeve 126. Obviously, keys or pins may be substituted for the friction rings 118 and 124 to effect the driving connections between the bevel gears 116 and 122 and their respective shafts. A pair of third miter gears 128 mesh with the gears 116 and 122, the gears 128 being rotatably mounted on shafts 130 and retained in place by means of snap rings 132, 134. A support ring or sleeve 136 has a pair of diametrically opposed bosses 138 which carry the shafts 130, pins 140 connecting the shafts to the bosses. The external diameter of the sleeve 136 is nearly equal to the interior diameter of the cylindrical housing 12 and the sleeve is positioned between a retainer ring 142 connected to the housing 12 and a rubber ring 144 carried by the housing end plate 18. The radially inner surface of the sleeve 136 carries a ring gear segment 146, the segment being located adjacent the end plate 18 and spanning an arc slightly greater than 180°. The ring gear segment 146 is in meshing engagement with a spur gear 148 keyed to a shaft 150 which extends through the end plate 18 and which has a knob 152 keyed to its outer end.

Rotation of the sleeve 136 by means of the knob 152 acting through spur gear 148 and ring gear 146 causes, through the miter gears 128 in engagement with the gears 116, 122, simultaneous equal rotation of the rotor assembly and the stator assembly and, consequently, simultaneous equal rotation of the weights 96, 104, 110 and 112, thereby rotating the plane $\theta$ in which the weights are aligned and along which the vibratory forces are generated.

The frequency of the vibratory motion produced by the contra-rotating weights is directly proportional to motor speed. Any suitable control circuitry 88 may be employed to regulate motor speed.

It should be noted that, in the embodiment of the invention described above, the two sets of contra-rotating weights are arranged in reverse relation to one another. Considering the arrangement of FIG. 3 and assuming, for purposes of discussion, that the rotor 54 rotates in a clockwise direction when viewed from the left end of the device, it will be apparent that the first set of weights includes a first weight 96 rotating in a clockwise fashion and a second weight 110 rotating in a counterclockwise fashion while the second set of weights includes a first weight 112 rotating in a counterclockwise fashion and a second weight 104 rotating in a clockwise fashion. The advantage of this arrangement is that the unbalanced moments arising in each set of weights as a consequence of the fact that the weights do not rotate in a common plane are in opposition to one another and, therefore, cancel or reduce one another so that vibrations other than those in the desired direction are eliminated or reduced to unobjectionable levels.

To understand the above described reduction or cancellation of unbalanced moments, consider the situation at the instant during which the weights of each set are diametrically opposed to one another. Since the weights do not rotate in a common plane, the centrifugal forces are not aligned with one another and, accordingly, produce a turning moment about a line which is perpendicular to the axis of rotation and to the line joining the centers of gravity of the weights of the pair. Since the second set of weights are arranged in the opposite order, the turning moment produced thereby is in the opposite direction. Obviously, if the two sets of weights are equal in magnitude and spacing, the two turning moments will be of equal absolute magnitudes and, hence, will cancel one another entirely.

Since, in the embodiment just described, the entire vibrator assembly including the drive motor, gearing and contra-rotating weights is contained in a single housing unit, the assembly may readily be constructed as a sealed unit, with the provision of appropriate shaft seals and gaskets between the end plates 18, 20 and the housing 12. Such an arrangement is advantageous for use in environments such as food handling and processing equipment where it is necessary to maintain high standards of sanitation, requiring the unit to be capable of being subjected to frequent washing or steam cleaning operations, as well as in situations in which the moving parts of the vibratory assembly must be protected from air borne dust or abrasive particles. Preferrably, the bearings 40, 42, 56 and 58 are permanently lubricated bearings eliminating the necessity of frequent lubrication of the assembly.

When desired, two or more units may be connected in tandem with the shaft end 44 of the first unit connected to the opposite shaft end 46 of the second unit so that the units operate in unison. Obviously, if this feature is not desired, the rotor shaft 48 may be shorter and solid end hubs 36, 38 employed.

Figure 8:
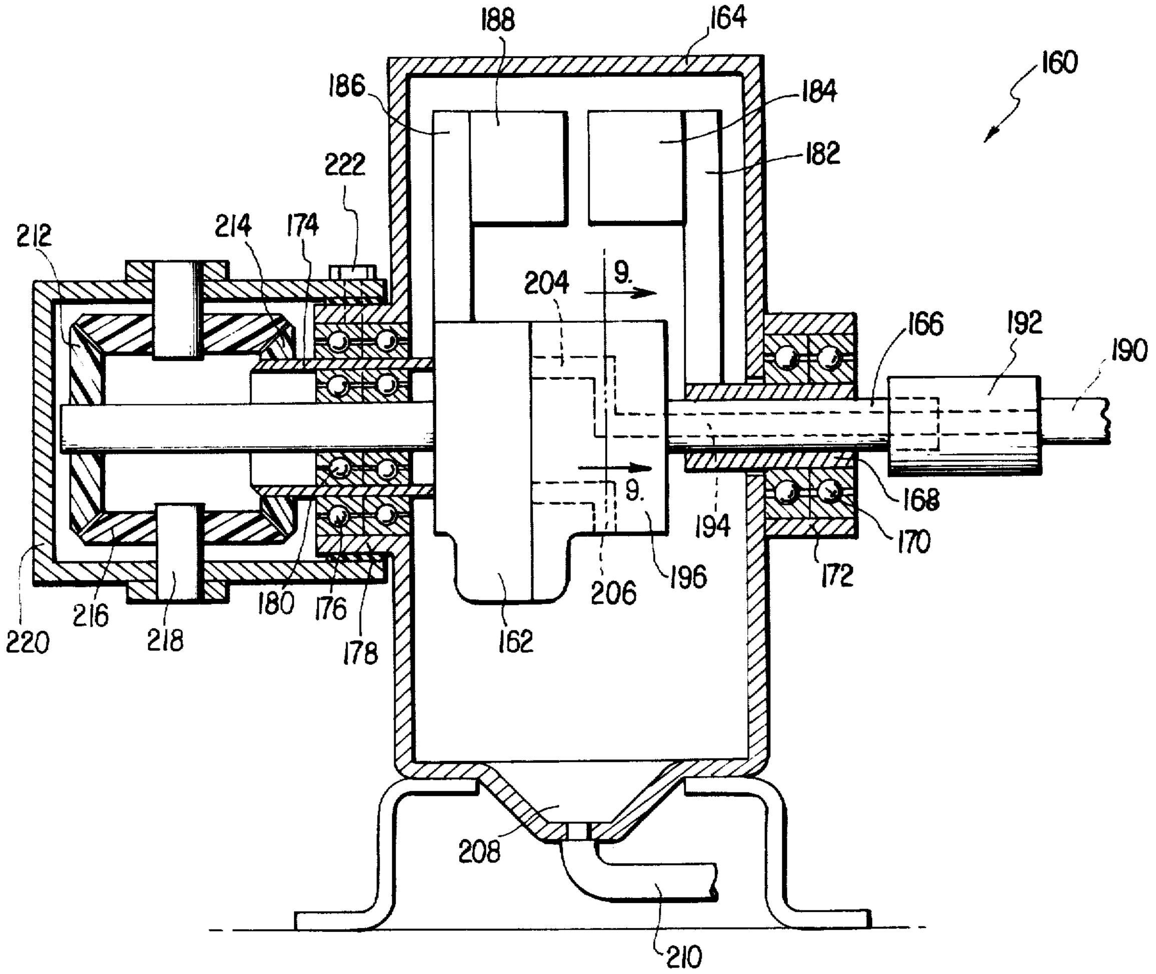
FIG. 8 is a longitudinal sectional view of a second embodiment of the contra-rotating vibrator of the present invention.
Figure 9:
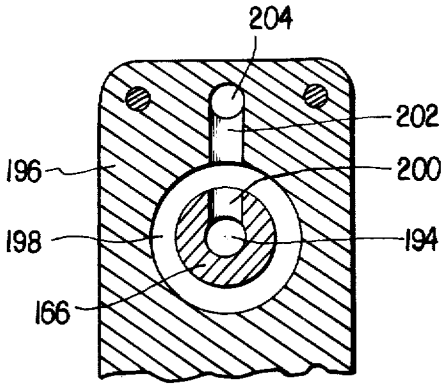
FIG. 9 is a fragmentary sectional view, taken along the line 9—9 of FIG. 8.

A second embodiment of the contra-rotating vibrator of the present invention is shown in FIGS. 8 and 9. In this embodiment, the vibrator 160 is driven by a hydraulic motor 162 which may be a conventional hydraulic motor of the type having a rotor mounted on a rotor shaft and a casing including a working chamber in which the rotor is contained. The motor 162 is contained within a housing 164, the rotor shaft 166 of the motor extending through the opposite side walls of the housing. One end of the rotor shaft 166 has a sleeve 168 keyed thereto, the sleeve being journaled in bearings 170 carried by a hub 172 affixed to the housing side wall. The opposite end of the rotor shaft 166 extending through the opposite side wall of the housing 164 is surrounded by a second sleeve 174 affixed to the casing of the motor 162. The sleeve 174 is journaled in bearings 176 carried by a hub 178 extending through the housing side wall. Bearings 180 within the sleeve 174 journal the rotor shaft 166. As a consequence of this mounting arrangement, the motor casing is capable of rotating about the rotor shaft 166 and both the casing and the shaft rotate relative to the housing 164. As will be described below, the rotor shaft 166 and the casing support sleeve 174 are interconnected by gearing so that the rotor and casing rotate in opposite directions and at equal rates. An arm 182 projects radially from the shaft support sleeve 168 and carries a weight 184 at its radially outer end. Another arm 186 extends radially from the motor casing and carries a weight 188 at its outer end. As in the previously described embodiment, the two weights 184, 188 are rotated in opposition to one another to produce linear vibratory motion.

Working fluid is supplied to the motor 162 from a supply conduit 190 through a rotary fluid coupling 192, the coupling being connected to one end of the rotor shaft 166 and communicating with a longitudinal passage 194 extending inwardly from the end of the shaft 166. The motor 162 of the illustrated embodiment has its inlet and discharge ports located on one of the end faces of the casing. A manifold 196 is attached to this end face. The manifold 196 includes an annular chamber 198 communicating with the longitudinal passage 194 of the shaft 166 by means of a port 200 end passages 202, 204 extending from the chamber 198 to the motor inlet port. The discharge port of the motor is in fluid communication with the interior of the assembly housing 164 through an additional passage 206 in the manifold 196. A sump 208 is provided in the bottom of the housing 164 and drains into a discharge line 210.

At the end of the rotor shaft 166 opposite the fluid connections, there is provided a bevel gear 212. The motor casing support sleeve 174 is also provided with a bevel gear 214 and these two gears are in meshing engagement with a pair of idler gears 216 rotating about stub shafts 218 mounted at diametrically opposed points on a gear casing 220. The gearing 212, 214, 216 functions in the same manner as the gearing of the previously described embodiment, assuring that the rotor shaft 166 with its eccentric weight 184 and the motor casing with its eccentric weight 188 rotate at equal speeds and in opposite directions.

The gear casing 220 is mounted for rotation about the axis of the rotor shaft 166, the casing 220 being supported on the radially outer surface of the hub 178. A latch or detent mechanism 222 is provided to normally hold the casing 220 against rotation. Rotation of the casing 220 serves the same function as rotation of the gear support sleeve 136 of the above described embodiment, i.e., uniform rotation of the shaft and motor casing in the same direction to rotate the radial plane in which the weights 184 and 188 are aligned and, consequently, the radial direction of the vibratory motion produced.

Figure 10:
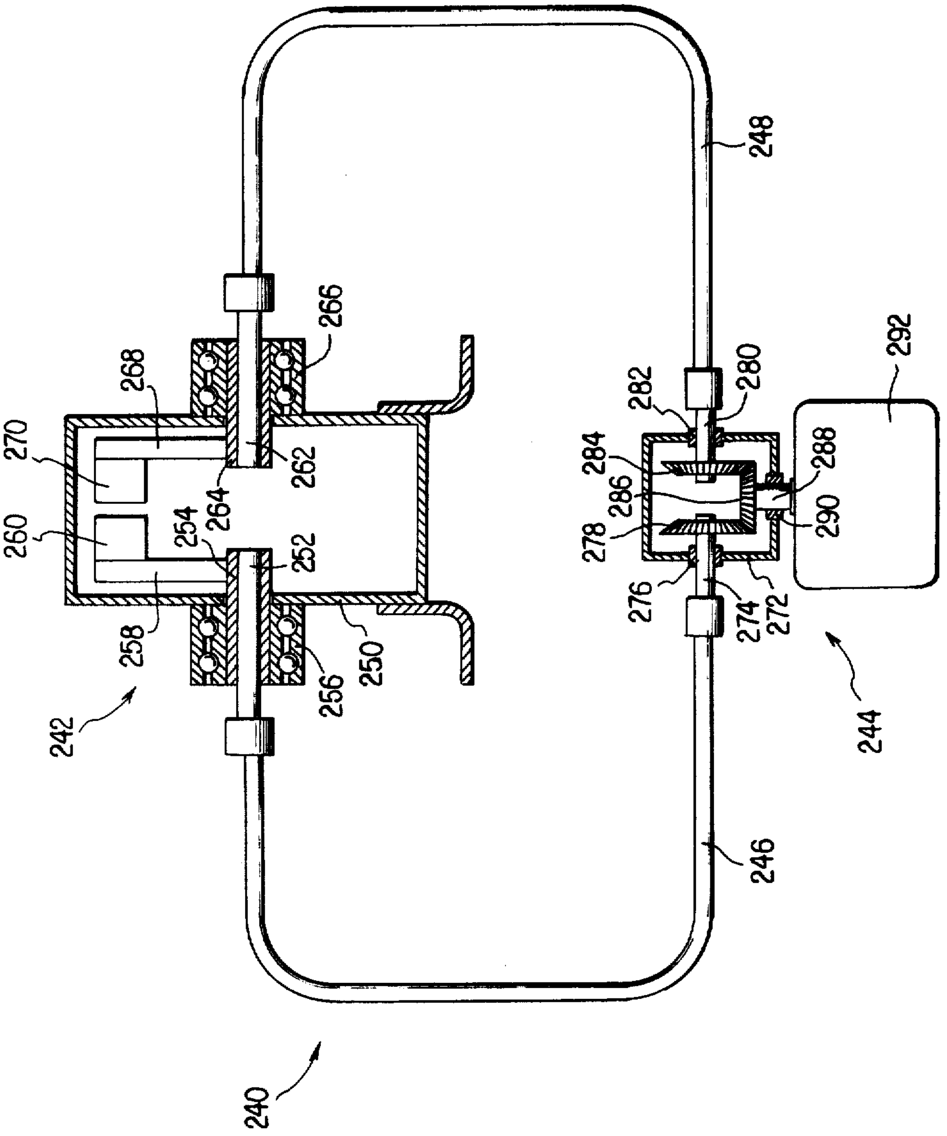
FIG. 10 is a transverse sectional view of a third embodiment of the contra-rotating vibrator of the present invention.

Referring now to FIG. 10, there is shown a third embodiment of the contra-rotating vibrator of my invention. This embodiment, designated generally by the reference numeral 240, includes a vibrator section 242 and a drive and control section 244, the two sections being interconnected by a pair of flexible drive shafts 246, 248. The vibrator section 242 includes a housing 250 and is adapted to be mounted on a conveyor or other element to which vibratory motion is to be imparted. A pair of shafts 252, 262 extend colinearly through opposite side walls of the housing 250, sleeves 254, 264 being keyed or otherwise secured to the shafts 252, 262, respectively, and are journalled in bearings 256, 266, respectively. An arm 258 extends radially from the sleeve 254 and mounts a weight 260 at its outer end. Likewise, an arm 268 extends from the sleeve 264 and mounts a weight 270 at its outer end. The drive and control section 244 includes a gear casing 272. A first shaft 274 extends through one side of the gear casing 272, being journalled in bearing 276 and having a first bevel gear 278 affixed to its inner end. Extending through the opposite side of the gear casing 272 and on a common axis with the shaft 274 is a second shaft 280, journalled in bearing 282 and having a second bevel gear 284 affixed to its inner end. The shafts 274 and 280 are connected to the corresponding shafts 252 and 262 of the vibrator section 242 by means of the flexible shafts 246 and 248, respectively. A third bevel gear 286 is in meshing engagement with the gears 278 and 284 and is affixed to a third shaft 288 journalled in a bearing 290 and having its axis perpendicular to the common axis of the first and second shafts 274 and 280. The shaft 288 and, accordingly, the bevel gear 286 are driven by a motor 292, which may, for example, be an electric, hydraulic, or pneumatic motor.

As is readily apparent from the preceeding description, rotation of the bevel gear 286 by the motor 292 causes the weights 260 and 270 to rotate by means of the gears 278, 284 and flexible shafts 246, 248, in opposite directions about the axis of the shafts 252, 262 thereby generating lineary directed vibratory motion which is transmitted to the structure in which the housing 250 is mounted. When it is desired to vary the direction of the vibratory motion, the gear casing 272 and motor 292 are rotated about the axis of the bevel gears 278, 284 and shafts 274, 280, thereby causing the weights 260 and 270 to rotate in unison to change the orientation of the plane in which the weights are aligned.

It will be understood that while preferred embodiments of the invention have been described in detail, the invention is not limited thereto or thereby. Rather, reference should be had to the appended claims in determining the true scope of the invention.

What is claimed is:

1. A device for producing vibratory motion, comprising:

a frame;

a motor carried by said frame comprising first and second members which impose reactive forces on one another and which rotate in opposite directions about a common axis in response to said forces;

a first weight connected to and rotating about said common axis with said first member, the center of gravity of said first weight being offset from said common axis; and a second weight connected to and rotating about said common axis with said second member, the center of gravity of said second weight being offset from said common axis, said second weight rotating in the opposite direction from said first weight.

2. The device of claim 1 further including gearing interconnecting said first and second members whereby said members rotate in opposite directions to one another at uniform angular velocities.

3. The device of claim 2 wherein said first member includes a shaft journalled on said frame, the axis of said shaft being coincident with said common axis, said gearing including a first bevel gear carried by and rotating with said shaft, a second bevel gear carried by and rotating with said second member, a third bevel gear in meshing engagement with said first and second bevel gears, and a carrier for said third bevel gear, said carrier being connected to said frame and journalling said third bevel gear for rotation about an axis perpendicular to said common axis.

4. The device of claim 3 further including means for controllably rotating said carrier about said common axis.

5. The device of claim 1 wherein said motor is a hydraulic motor.

6. The device of claim 1 wherein said motor is an electric motor.

7. The device of claim 1 further including a third weight connected to and rotating with said first member and a fourth weight connected to and rotating with said second member, the centers of gravity of said third and fourth weights being offset from said common axis.

8. The device of claim 7 wherein said third and fourth weights are in reverse succession from said first and second weights whereby the turning moment generated by said first and second weights perpendicular to said common axis opposes the turning moment generated by said third and fourth weights.

9. A device for producing vibratory motion, comprising:

a housing having spaced end walls;

an electric motor mounted within said housing, said motor having a rotor, a rotor shaft journalled on said end walls, a stator, a stator frame journalled for rotation about said rotor shaft whereby said rotor and stator rotate in opposite directions about a common axis of rotation;

a first weight connected to and rotating about said axis of rotation with said rotor shaft, the center of gravity of said first weight being offset from said axis of rotation; and a second weight connected to and rotating about said axis of rotation with said stator frame, the center of gravity of said second weight being offset from said axis of rotation, said second weight rotating in the opposite direction from said first weight.

10. The device of claim 9 further including gearing interconnecting said rotor and stator to assure synchronized rotation thereof.

11. The device of claim 10 wherein said gearing includes a first bevel gear carried by and rotating with said rotor shaft, a second bevel gear journalled on said rotor shaft and rotating with said stator frame, a third bevel gear in meshing engagement with said first and second bevel gears, and a carrier for said third bevel gear, said carrier journalling said third bevel gear for rotation about an axis perpendicular to said common axis.

12. The device of claim 11 further including means for controllably rotating said carrier about said common axis.

13. The device of claim 11 wherein said housing includes a cylindrical casing extending between and connected to said end walls, said carrier includes a cylindrical sleeve having an external diameter slightly less than the internal diameter of said casing and located within said casing adjacent one of said end walls, and said carrier further includes a stub shaft carried by said sleeve extending radially inwardly therefrom and journalling said third bevel gear.

14. The device of claim 13 further including means to controllably rotate said carrier about said common axis.

15. The device of claim 14 wherein said last mentioned means includes a ring gear segment affixed to said sleeve, a spur gear meshing with said ring gear segment, and a shaft keyed to said spur gear and extending through said adjacent one of said end walls.

16. The device of claim 9 further including a third weight connected to and rotating with said rotor shaft and a fourth weight connected to and rotating with said stator frame, the centers of gravity of said third and fourth weights being offset from said axis of rotation.

17. The device of claim 16 wherein said third and fourth weights are in reverse succession from said first and second weights whereby the turning moment generated by said first and second weights perpendicular to said axis of rotation opposes the turning moment generated by said third and fourth weights.

18. A device for producing vibratory motion, comprising:

a frame;

first and second shafts journalled in said frame for rotation about a common axis;

a first weight connected to and rotating with said first shaft, the center of gravity of said first weight being offset from said common axis;

a second weight connected to and rotating with said second shaft, the center of gravity of said second weight being offset from said common axis;

a first bevel gear connected to and rotating with said first shaft;

a second bevel gear connected to and rotating with said second shaft, said first and second bevel gears rotating about a common axis;

a third bevel gear in meshing engagement with said first and second bevel gears a carrier for said third bevel gear, said carrier including a third shaft the axis of which is perpendicular to said common axis of said first and second bevel gears and on which said third bevel gear is mounted, said carrier being controllably rotatable about said common axis of said first and second bevel gears; and a motor connected to one of said shafts to effect rotation thereof.

* * * * *